Figure 1:
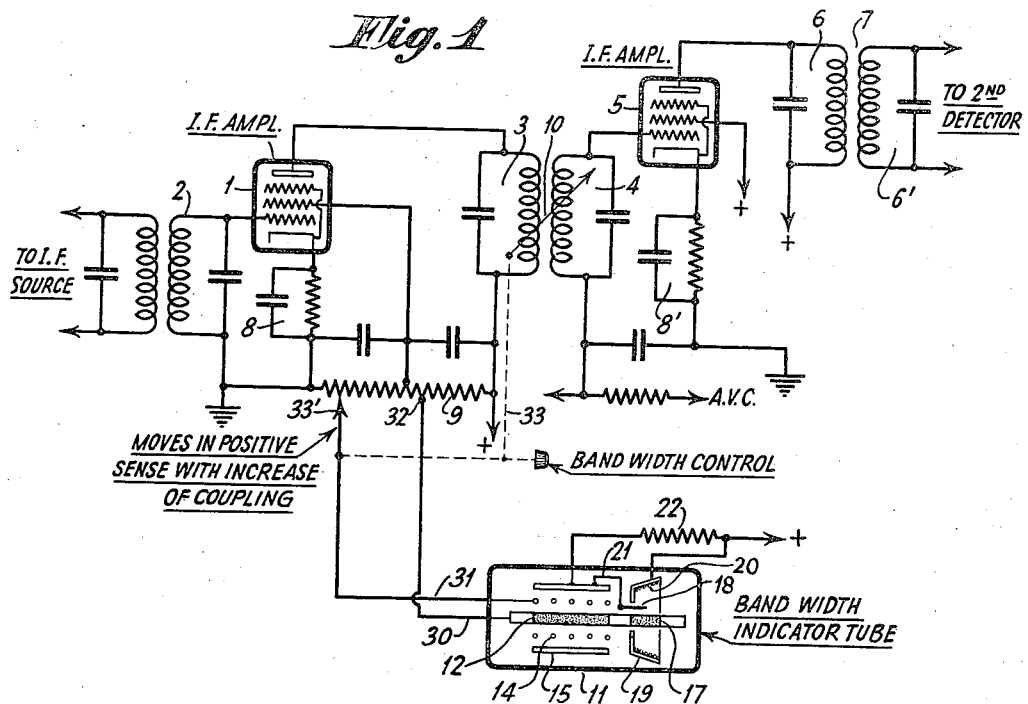

July 11, 1939.　　　C. N. KIMBALL ET AL　　　2,165,799
BAND WIDTH INDICATOR CIRCUIT
Filed Jan. 28, 1937

INVENTORS
CHARLES N. KIMBALL
EDWARD W. WILBY
BY
ATTORNEY

Patented July 11, 1939

2,165,799

UNITED STATES PATENT OFFICE 2,165,799

BAND WIDTH INDICATOR CIRCUIT

Charles N. Kimball, East Orange, N. J., and Edward W. Wilby, Staten Island, N. Y., assignors to Radio Corporation of America, a corporation of Delaware Application January 28, 1937, Serial No. 122,718

5 Claims. (Cl. 250—20)

Our present invention relates to high frequency indicator circuits, and more particularly to electron ray tube indicator circuits for visually indicating adjustments made by a band width control device of a radio receiver.

Electron ray tube circuits have been used in the past visually to indicate changes in tuning of the signal networks of a receiver. For example the 6E5 tube has been disclosed by H. M. Wagner in U. S. P. 2,051,189, of Aug. 18, 1936, as adapted for use in a receiver employing A. V. C.; the tube acting to indicate accurately the resonance condition of the receiver as the latter is tuned from one station to another. In such a system the visual indication is produced by a direct current voltage derived from the signal energy. Now it often happens that receivers are equipped with manually adjustable band width controls; in such cases actuation of the band width control device varies the resonance curve characteristics at a given station setting. For example, when receiving local stations it is desired to have the receiver signal networks provided with band pass characteristics; during weak, or distant, station reception it is desirable to have the same networks provided with single peaked, or relatively sharp, selectivity. If changes in band width of the signal networks are to be visually represented, the aforementioned Wagner circuit arrangement cannot be employed. The latter employs A. V. C. bias to operate the indicator tube, and the bias depends on carrier amplitude. Since band width adjustment is made without change in carrier frequency of the signal networks, it will be seen that the prior arrangements cannot be used.

Accordingly, it may be stated that it is one of the main objects of our invention to provide a band width control device for a receiver, wherein a visual indicator is employed to inform the receiver operator when the signal reception networks are broadly or sharply tuned at a given carrier frequency setting of the receiver.

Another important object of this invention is to provide a signal transmission circuit with a means for selecting a predetermined band width, an electron ray tube being used in conjunction with the band selector means to indicate visually a range of band width adjustments.

Another object of our invention is to provide a 6E5 type indicator tube for the I. F. transmission network of a superheterodyne receiver, there being a band width selector device operatively associated with the transmission network for varying the sharpness of tuning thereof, and a biasing means for the indicator tube being adjustable with the band selector to permit the tube to indicate a wide range of band widths of the I. F. network.

Still other objects of our invention are generally to improve the efficiency and operation of band width selectors for receivers, and more especially to provide an electron ray indicator tube circuit which not only fully indicates the range of band width variation but is economically assembled in a receiver.

The novel features which we believe to be characteristic of our invention are set forth in particularity in the appended claims; the invention itself, however, as to both its organization and method of operation will best be understood by reference to the following description taken in connection with the drawing in which we have indicated diagrammatically a circuit organization whereby our invention may be carried into effect.

Figure 2:
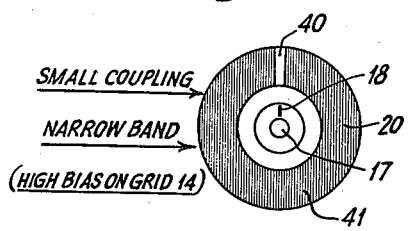
Figure 3:
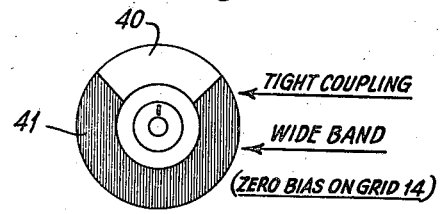

In the drawing:

Fig. 1 is a circuit diagram of a portion of a superheterodyne receiver embodying the invention, Figs. 2 and 3 show successive appearances of the indicator face of the 6E5 tube as the band selector device is adjusted.

In the circuit shown in Fig. 1 there is shown that portion of a superheterodyne receiving circuit which is located between the source of the I. F. energy and the second detector. Those skilled in the art will readily understand that the source of energy may be the I. F. output circuit of the first detector network, or it may be the output circuit of an I. F. amplifier. The second detector may be of any well known type; for example, a diode circuit may be used which not only produces audio frequency energy for the successive audio utilization network, but, in addition, produces direct current voltage for A. V. C. purposes. An amplifier tube 1 is shown having its input electrodes coupled to the I. F. source through a resonant coupling transformer 2; the primary and secondary circuits of the transformer each being tuned to the operating I. F. The I. F. value may be chosen from a range of 75 to 465 k. c. The output circuit of the output amplifier 1 is denoted by the numeral 3, and it will be observed that it comprises the usual shunt condenser and coil which are resonated to the operating I. F.

The output circuit 3 is magnetically coupled to the I. F. resonant input circuit 4 of the following amplifier 5. The input circuit 4 is connected between the input electrodes of the amplifier 5, and the output circuit 6 of the amplifier 5 is similarly resonated to the operating I. F. It will be understood that the coupling transformer 7 has its primary circuit 6 and its secondary circuit 6' each resonated to the operating I. F. The circuits 3 and 4 may be similarly constructed; that is to say, each of these circuits includes a condenser and coil, the coils of the primary and secondary circuits being magnetically coupled. It will, therefore, be seen that each of the resonant circuits of the I. F. coupling transformers is tuned to the operating I. F.

In the grounded cathode lead of amplifier 1 is disposed a self-bias network 8 which provides the normal operating negative bias for the signal grid of the amplifier; the bias network 8' in the grounded cathode lead of amplifier 5 functions similarly to provide the normal operating bias for the signal grid of amplifier 5. It will be understood that the positive electrodes, such as the screen grids and plates of amplifiers 1 and 5, are to be connected to points of proper positive potential on the usual voltage supply bleeder of the receiver. The numeral 9 designates an auxiliary bleeder resistor, which may be a part of the common voltage supply potentiometer, connected to the grounded side of the bias network 8 and the screen grid and plate leads of amplifier 1.

The arrow 10 passing through the coupled coils of circuits 3 and 4 is to be understood as representing any well known device for adjusting the band width of the network 3—4. Those skilled in the art are fully aware of the fact that variation of the coupling percentage between the coils of circuits 3 and 4 varies the band width characteristic. For example, when the coils have slightly less than, or exactly, critical coupling, then the resonance curve characteristic of the circuits 3—4 has a single peak, and the network will have relatively sharp selectivity. On the other hand when the coupling between the coils is adjusted to be substantially more than critical coupling, then a double-peaked resonance curve is secured, and the network will have a band pass characteristic; the latter characteristic being desirable for reception of local stations with high fidelity of reproduction of the audio modulation frequencies. It is to be clearly understood that any device well known to those skilled in the art which functions to vary the band width of the network 3—4 may be utilized. The present disclosure necessitates only the requirement that the numeral 10 designate an instrumentality which functions to adjust the percentage coupling between circuits 3 and 4 through a relatively wide range, and without changing, or shifting, the mean resonant frequency of the network.

To indicate in a visual manner the variation in band width, or reproduction fidelity, with change in coupling between the I. F. circuits, there is employed an electron ray indicator tube 11. While it is to be understood that this indicator tube may be of any well known type which will indicate the degree of coupling between circuits 3 and 4 as the device 10 is adjusted, there is shown by way of illustration a tube of the well known 6E5 type. It has been explained heretofore that the Wagner patent discloses such an indicator tube. The tube is schematically represented in Fig. 1, since its detailed constructional features are shown in the aforesaid Wagner patent. Those skilled in the art will readily be able to construct a tube adapted to the present invention by following the teachings in the Wagner patent.

The tube 11 is provided with a cathode 12 of the conventional, indirectly heated, equipotential type. A grid 14 is concentric and co-extensive with, and surrounds, the cathode. An anode 15 is co-axially arranged in spaced relation to, and surrounds, the grid 14. The control grid is wound with a continuous pitch, and it will be seen that with cathode 12 and anode 15 it provides a triode section. The cathode 12 is extended upwardly, and provided with a second emission section 17. A control electrode 18 is disposed on one side of the emission section 17; the electrode 18 may be a rod, or a strip of vane-shaped sheet material, which is placed edgewise to the emission section 17. Surrounding, and concentric with, the emission section 17 is an anode 19 shaped like a dishpan; the latter has coating 20 on its inner inclined face. The coating 20 is composed of a material which is fluorescent under electron bombardment. A circuit aperture is provided in the base of the anode 19 to permit the cathode 17 and electrode 18 to be positioned at the axis of the anode 19.

The electrode 18 is connected by lead 21 to the plate 15 while the plate 15 is connected to a source of proper, positive, direct current potential through a resistor 22. The anode 19 is connected to the positive side of resistor 22. The cathodes 12 and 17 are connected to a point 32 on the auxiliary bleeder resistor 9 by way of the lead connection 30. The grid 14 is connected by lead 31 to any desired point on resistor 9 by means of tap 33' and the latter is movable over the resistor. The screen lead of amplifier 1 is connected to an intermediate point on the resistor 9. The dotted lines 33 represent a mechanical unicontrol adjusting mechanism adapted to correlate the adjustment of tap 33' and coupling varying means 10. The tap 33' is adjusted in an increasing positive potential sense as the coupling varying means 10 is actuated to increase the coupling between the circuits 3 and 4. Such a correlation of bias change on grid 14 with coupling variation results in the shadow changes of Figs. 2 and 3.

Electrons emitted from section 17 strike the coating 20, and cause it to fluoresce. The electrons travel radially outwardly from the cathode 17 to the coating 20 in a wide beam. The extent of the anode surface reached by the beam is determined by the direct current voltage on electrode 18. When the electrode 18 is at its lowest positive potential with respect to the cathode 17, due to low values of grid bias, electrons striking the coating 20 produce an annular pattern of luminescence as shown in Fig. 3 in which a large shadow angle is present. As the electrode 14 becomes negative with respect to cathode 17, the shadow area 40 decreases with the increasing negative bias on electrode 14. The numeral 41 denotes the luminescent portion of the indication pattern. Assume that the device 10 has been adjusted for small, or relatively loose, coupling between circuits 3—4. In that case the tap 33' will be adjusted so that the negative bias on grid 14 is such as to cause zero shadow angle to appear on the luminescent screen of the electron ray indicator tube. The current flow through, and voltage drop across, resistor 22 is a minimum, and the size of resistor 22 and the bias developed across the bleeder 9 between taps 32 and 33' when at their maximum separation, is just sufficient (about −8 volts) to cause plate current cut-off in the triode section of the indicator tube. The area of 40 in Fig. 2 denotes, therefore, that network 3—4 has been adjusted to give high selectivity. When circuits 3—4 are more closely coupled so as to give a band-pass characteristic, tap 33' moves closer to 32, dropping the bias on grid 14, which results in a wider shadow angle on the screen of the indicator tube as shown, for instance, in Fig. 3.

With the circuit shown in Fig. 1 the relation between the degree of coupling of circuits 3—4 and the angle 40 subtended on the face of anode 19 will be such as to cause the widest angle with closest coupling. As the band width control device is adjusted, the shadow angle 40 will be observed to change. The receiver operator will find it simple to secure the desired band width for the I. F. network; he will only have to observe the shadow area 40. Since the area is narrow when the selectivity is sharp and vice versa, the operator will have a visual band width indicator before him.

Of course, the tap 33' and device 10 may be correlated in motion in any desired manner; they may be adjusted simultaneously; successively; or in overlapping relation. Again, the resistor 9 may be of the tapered type, with the taper in a desired polarity direction, if the bias change on grid 14 is to be non-uniform. Also, it is possible to reverse the sense of change of the area 40 by reversing the bias polarity on grid 14. Where desired, the indicator tube may use oppositely arranged control electrodes 18 so that opposed shadow areas may appear on the anode 19. In such case, a pair of triode sections would be provided in the envelope of tube 11; each electrode 18 would have its specific triode amplifier and resistor 22. One of the grids 14 would receive bias from the A. V. C. source, and its respective electrode 18 would then provide a shadow area on the anode 19 which indicates the exact tuning position of tuning device of the set.

While we have indicated and described a system for carrying our invention into effect, it will be apparent to one skilled in the art that our invention is by no means limited to the particular organization shown and described but that many modifications may be made without departing from the scope of our invention, as set forth in the appended claims.

What we claim is:

1. In a band pass transmission network of the type comprising at least two reactively coupled circuits tuned to a common carrier frequency; means for varying the degree of reactive coupling between the coupled circuits to change the band width of the network; a visual current indicator; means for controlling indications of the indicator; and a common device for actuating the control means and coupling varying means, said indicator including a source of electrons, an anode adapted to become luminous when electrons strike it, a control electrode for regulating the area on the anode which becomes luminous; and said controlling means including a source of variable bias adapted to control the potential of said control electrode.

2. In combination with an intermediate frequency transmission network of the type including at least two coupled resonant circuits which are tuned to a common, operating frequency, means for varying the band width of the coupled circuits, an electron ray indicator tube of the type including an electron-responsive fluorescent anode and a control electrode, a source of bias connected to the control electrode for varying the potential of the latter, and means, simultaneously operative with said band varying means, for adjusting the magnitude of the bias applied to said control electrode thereby to vary the area of fluorescence on the said anode.

3. In combination with a resonant signal transmission network of the band pass type, means for varying the response characteristic of the network in a sense such that it is highly selective for weak signals, a visual indicator of the type utilizing a fluorescent anode, means for producing a shadow of variable width on said anode, and a common means for actuating said shadow producing means conjointly with said varying means and in a sense such that said shadow is of minimum width when the network is adjusted to be highly selective.

4. In a radio receiver, the combination with a signal transmission network of the band pass type, of means for varying the response characteristic of the network through a range from a condition of high selectivity to one of high fidelity, a visual indicator of the type utilizing a fluorescent anode, means for producing a shadow of variable width on said anode, and a common means for actuating said shadow producing means conjointly with said response varying means in a sense such that said shadow is of minimum width when the network is adjusted for high selectivity and of maximum width when the network is adjusted for high fidelity.

5. In a radio receiver, the combination with a signal transmission network of the band pass type, of means for varying the response characteristic of the network through a range from a condition of high selectivity to one of high fidelity, a visual indicator of the type utilizing a fluorescent anode, and having a control grid and a cathode, a voltage divider and a fixed connection to an intermediate point thereof from the cathode, a variable connection from the control grid to a point on said voltage divider of lower potential, the difference in potential between said grid and cathode connections determining the width of shadow on the fluorescent anode, and a common means for adjusting the variable grid connection conjointly with said response varying means in a sense such that said shadow is of minimum width when the network is adjusted for high selectivity and of maximum width when the network is adjusted for high fidelity.

CHARLES N. KIMBALL.
EDWARD W. WILBY.